Dec. 6, 1949     M. E. PALSGROVE     2,490,319
LIQUID FUEL REGULATOR
Filed Feb. 11, 1946
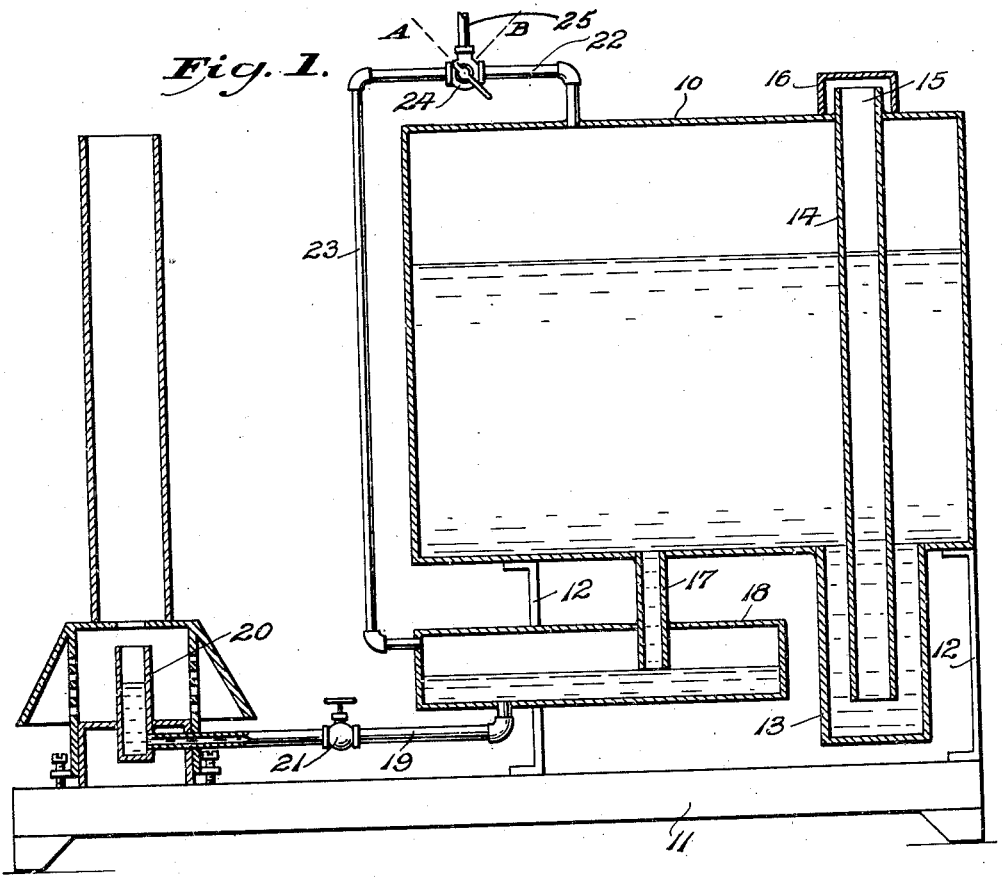
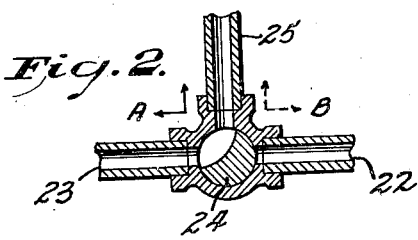
INVENTOR.
M. E. Palsgrove
BY
ATTORNEY.

Patented Dec. 6, 1949

2,490,319

UNITED STATES PATENT OFFICE 2,490,319

LIQUID FUEL REGULATOR

Merlin E. Palsgrove, Columbus, Ohio

Application February 11, 1946, Serial No. 646,892

6 Claims. (Cl. 137—68)

My invention deals with mechanisms for regulating the flow of liquids, and more specifically to liquid fuel regulators of the type adapted to maintain a constant fuel level within fuel burners.

In the past, fuel regulators of the float controlled valve type have been used, but these types present certain mechanical problems which tend to make such a mechanism inoperative or inefficient. Also, the type of fuel regulator incorporating an inverted storage tank has been used. However, in such a type, it is necessary to detach the storage tank from the remainder of the regulator unit to refill same, and a consequent interruption in the regulated flow occurs.

It is an object of my invention to provide a fuel regulator, adapted to maintain a constant fuel level, which operates independently of movable parts on a gravitational and pressure flow principle.

It is another object of my invention to provide a fuel regulator incorporating a storage tank in which the use of an air-tight filling cap is unnecessary, due to the fact that no inversion or detachment of the storage tank is required for refilling operations.

It is a further object of my invention to provide valve means, cooperative with such a fuel regulator, whereby the operation of the burner is maintained during the refilling process of the storage tank, and which eliminates the possibility of flooding within a burner element.

For a more complete understanding of my invention, reference is made to the following description and the attached drawings, wherein:

Fig. 1 is a vertical sectional view disclosing the improved liquid fuel regulator forming the present invention and illustrating the same in association with a fuel burner;

Fig. 2 is a detail vertical sectional view through the valve of the regulator.

With reference to the drawings, it will be seen that my fuel regulator employs a storage tank 10 supported by and rigidly attached to a platform base 11 by means of vertical beams 12. The storage tank has a downwardly extending sump 13 which receives the lower open end of a filler tube 14. This tube extends upwardly through the tank and terminates in an externally located filler neck 15. The tube 14 is supported in this manner by the top wall of the tank and forms an air-tight connection therewith. This may readily be accomplished by welding or by air-tight packing. A cap 16 is provided to cover the open filler neck 15 to prevent foreign matter from entering the tank. The tank is supplied with a pipe 17 located in its bottom portion. The pipe 17 extends downwardly into an auxiliary fuel chamber 18. The lower end of the pipe extends internally of the chamber to a position approximately one-half the depth of the chamber. The supporting connections between the pipe, tank and chamber are all of an air-tight nature which may readily be accomplished by welding.

The end of the fuel conduit 19 is placed in the bottom of the chamber 18 and extends horizontally to the lower end of a vertically situated fuel vaporizer or cup 20. A shut-off valve 21 is disposed in the length of the conduit and serves to either open, meter or close the flow of fuel between the chamber 18 and the vaporizer 20.

Both the tank 10 and the chamber 18 contain air vent pipes 22 and 23 respectively. These pipes are located substantially in the tops of each. Both vent pipes extend upwardly and are united by a three-way valve 24 having a vent opening 25. Referring to Fig. 2, it will be seen that the valve 24 is constructed so as to have two operating positions A and B, in which position A opens the chamber pipe 23 to the vent opening 25 and allows atmospheric pressure to be present within the chamber 18, and at the same time closes the tank pipe 22. Position B in the valve is just the opposite of position A in that the tank pipe 22 is open to the atmosphere and the chamber pipe 23 is closed.

In the filling operation of the tank, the shut-off valve 21 in the fuel conduit is placed in a closed or metering position so as to restrict the flow of fuel between the chamber 18 and the fuel vaporizer 20, and thereby eliminates the possibility of flooding or overflow within the fuel vaporizer. The three-way valve 24 is then placed in position B, that is, opening the tank vent pipe 22 to the atmosphere and closing the chamber vent pipe 23 so as to trap the air above the fuel level within the chamber 18. The filler cap 16 is removed and fuel is introduced to the tank by way of the filler tube 14, and may be brought up to any desired level in the tank.

After filling the storage tank, the regulator is returned to its operating condition by turning the three-way valve 24 to the A position, or operating position, thus closing the tank to atmospheric pressure and opening the chamber to the atmosphere. The shut-off valve 21 is then opened and a constant level of fuel will be maintained in the fuel vaporizer 20.

With reference to Fig. 1 of the drawings, it will be seen that as long as the lower end of the pipe 17 extending into the chamber 18 is covered by the fuel, fuel flow between the tank and the chamber will be stopped. This is manifest by the fact that a vacuum is created above the fuel level in the tank as the fuel tends to gravitate, and as long as the vacuum pressure equals or exceeds the head pressure of the fuel within the tank, the flow of fuel from the tank to the chamber is impossible. However, as the fuel level is decreased within the chamber 18 by the burning of fuel within the fuel vaporizer 20, the lower end of the pipe 17 will eventually be uncovered to permit the upward flow of atmospheric air into the tank and thereby relieve the vacuum pressure above the fuel, thus permitting the gravitational flow of fuel from the tank to the chamber until the mouth of the pipe 17 is again covered by fuel. It will therefore be seen that a substantially constant level of fuel within the chamber and within the connecting fuel vaporizer will be maintained.

The purpose of the sump 13 at the bottom of the tank 10 is to permit the extension of the filler tube 14 into the tank to a depth sufficient to allow practically all the fuel within the tank, with the exception of the amount within the sump, to be drawn off and, at the same time, to permit operation of the unit independently of an airtight filler cap.

By the elimination of an air-tight cap, the system will not be rendered inoperative due to leaking gaskets or packing normally accompanying such an air-tight cap.

In view of the foregoing, it will be manifest that my invention provides a highly operative liquid level regulator that is free of complicated movable parts which normally tend to reduce the efficiency of such regulators. While I have disclosed my improved regulator in use with a fuel burner, it will be understood that its use will be applicable to many different mechanisms requiring a constant level of liquid for operation.

My invention is characterized by its structural simplicity, its operational efficiency and its economy of maintenance.

While I have disclosed what I now deem to be the preferred form of my invention, it will be manifest that various changes in design and details of construction may be later accomplished without departing from the spirit of my invention or the scope of the following claims.

I claim:

1. Flow-regulating apparatus for liquids comprising a closed tank having a sump extending downwardly from the bottom thereof, an externally accessible and vertically disposed filling tube extending downwardly through said tank and having a lower end opening within the sump thereof, a closed liquid-receiving container disposed below said tank, a conduit extending between said tank and said container for transferring liquid from said tank to said container by gravitational flow, said conduit having a lower end terminating intermediate the depth of said container at a level above the lower end of said filling tube, a discharge outlet disposed in the bottom of said container, means for opening and closing said outlet, and means for selectively and separately venting said tank and said container.

2. Flow-regulating apparatus for liquids comprising a closed storage tank having a sump extending downwardly from the bottom thereof, an externally accessible filler tube extending downwardly through said tank and having a lower end terminating within the sump thereof, a closed liquid-receiving container disposed generally below the bottom of said tank, a conduit extending from said tank and having a lower end communicating with said container at a level above the level of the lower end of said filler tube for transferring liquid contained in said tank to said container by gravitational flow, a discharge outlet disposed in the bottom of said receptacle, means for selectively opening or closing said outlet, and closeable air vents communicating with the interiors of said tank and said container at the upper portions thereof.

3. Flow-regulating apparatus for liquids comprising a closed tank provided with a downwardly extended region, an externally accessible and vertically disposed filling tube having a lower end communicating with the interior of said tank at the downwardly extended region thereof, a closed liquid-holding receptacle disposed generally below the level of said tank, a conduit connected between said tank and said receptacle for transferring liquids contained in said tank to said receptacle by gravitational flow, said conduit having a lower end terminating within said receptacle above the level of the lower end of said filling tube, a discharge outlet communicating with the bottom of said receptacle, valve means for opening and closing said outlet, and means for selectively venting the upper portion of said tank or said receptacle to the atmosphere.

4. In a liquid fuel-burning system having a fuel-vaporizing burner, fuel flow-regulating apparatus comprising a closed storage tank having a sump extending downwardly from the bottom thereof, an externally accessible vertically disposed filling tube extending downwardly within said tank and having a lower end opening within the sump thereof, an auxiliary receptacle disposed below said tank, a conduit communicating at one end with the interior of said tank and at its opposite end with the interior of said receptacle at a level above the lower end of said filler tube, said conduit being arranged to transfer liquid fuel contained in said tank to said auxiliary receptacle by gravitational flow, a fuel outlet conduit communicating at one end with the interior of said auxiliary receptacle, a valve disposed in said outlet conduit and operable to open or close the same, and means for selectively and separately venting said tank and said receptacle.

5. Flow-regulating apparatus for liquids comprising a main storage tank formed at its bottom with a downwardly extending sump, an externally accessible and vertically arranged filling tube extending downwardly within said tank and terminating at its lower end within the sump portion thereof, a closed liquid-holding receptacle disposed beneath said tank adjacent the sump thereof, a conduit leading from the bottom of said tank and extending within said receptacle for transferring liquids contained in said tank to said receptacle by gravitational flow, said conduit having its lower end terminating above the level of the lower end of said filling tube and disposed in spaced relation to the bottom of said receptacle, a liquid discharge outlet disposed in the bottom of said receptacle, a valve disposed in said outlet and operable to open or close the same, and means operable to selectively and separately vent the upper portions of said tank and said receptacle to the atmosphere, said last-named means functioning to relieve pressure above a body of liquid disposed in said tank during introduction of liquids therein by way of said filling tube and simultaneously to close said receptacle to prevent the gravitational flow of liquids thereto from said tank during introduction of liquids through said filling tube.

6. Flow-regulating apparatus for liquids comprising a main storage tank formed at its bottom with a downwardly extending sump, an externally accessible and vertically arranged filling tube extending downwardly within said tank and terminating at its lower end within the sump portion thereof, a closed liquid-holding receptacle disposed beneath said tank adjacent the sump thereof, a conduit leading from the bottom of said tank and extending within said receptacle for transferring liquids contained in said tank to said receptacle by gravitational flow, said conduit having its lower end terminating above the level of the lower end of said filling tube and disposed in spaced relation to the bottom of said receptacle, a liquid discharge outlet disposed in the bottom of said receptacle, a valve disposed in said outlet and operable to open or close the same, and means operable to selectively and separately vent the upper portions of said tank and said receptacle to the atmosphere, said last-named means including a conduit communicating with said tank and said receptacle at their upper portions and a three-way valve disposed in said conduit.

MERLIN E. PALSGROVE.

REFERENCES CITED

The following references are of record in the file of this patent:

UNITED STATES PATENTS

| Number | Name | Date |
|---|---|---|
| 843,925 | Bernard | Feb. 12, 1907 |
| 1,043,488 | Waugh | Nov. 5, 1912 |
| 1,705,845 | Woodman | Mar. 19, 1929 |
| 1,833,150 | Beechlyn | Nov. 24, 1931 |
| 2,018,853 | Hitchcock | Oct. 29, 1935 |
| 2,353,341 | Klonaris | July 11, 1944 |